United States Patent
Petersen et al.

(10) Patent No.: US 6,943,675 B2
(45) Date of Patent: Sep. 13, 2005

(54) LOCOMOTIVE HAND BRAKE ALARM

(75) Inventors: David E. Petersen, Erie, PA (US); Jan Alan Nagle, Erie, PA (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 10/005,399

(22) Filed: Dec. 5, 2001

(65) Prior Publication Data

US 2003/0058091 A1 Mar. 27, 2003

Related U.S. Application Data

(60) Provisional application No. 60/324,342, filed on Sep. 24, 2001.

(51) Int. Cl.$^7$ ................................................. B60Q 1/00
(52) U.S. Cl. ..................... 340/453; 340/457.3; 340/438; 340/441; 340/460; 188/34; 188/162
(58) Field of Search ................................. 340/453, 457, 340/457.3, 438, 459, 460, 441, 461; 188/1.11, 208, 173, 180; 303/7, 8, 71, 107, 22.6; 116/208

(56) References Cited

U.S. PATENT DOCUMENTS

| | | | |
|---|---|---|---|
| 3,854,417 A | | 12/1974 | MacDonnell et al. |
| 4,033,629 A | | 7/1977 | Spalding |
| 4,161,717 A | * | 7/1979 | Hoover et al. ................ 340/62 |
| 4,296,707 A | | 10/1981 | Kennedy |
| 4,368,927 A | | 1/1983 | Billingsley et al. |
| 4,687,258 A | * | 8/1987 | Astley ........................... 303/3 |
| 4,962,570 A | * | 10/1990 | Hosaka et al. ............... 123/399 |
| 5,394,137 A | | 2/1995 | Orschek |
| 5,590,042 A | * | 12/1996 | Allen, Jr. et al. ............... 303/3 |
| 5,701,974 A | | 12/1997 | Kanjo et al. |
| 6,006,868 A | * | 12/1999 | Klink ........................... 340/453 |
| 6,112,860 A | | 9/2000 | Shepherd et al. |

* cited by examiner

*Primary Examiner*—Hung Nguyen
(74) *Attorney, Agent, or Firm*—Carl Rowold; David G. Maire; Beusse Brownlee Wolter Mora & Maire, P.A.

(57) ABSTRACT

A hand brake system (40) for a rail vehicle providing a hand brake position alarm (76) before a train is moved with a hand brake not fully released. A switch (56) detects the position of a hand brake drive chain (18) to provide a brake engaged signal (60). The weight of the drive chain is supported through a load path that bypasses the switch. A master controller reverser handle position detector (74) provides a reverser handle position signal (72) when the reverser handle is moved out of neutral in preparation for providing power to the locomotive drive motors (15). A relay (70) is used to actuate the multiunit wheel slip indicator (54) and the general alarm bell (52) in every locomotive of the train consist when the brake engaged signal is coincident with the master controller reverser handle position signal. This combination of alarms, which normally indicates a locked axle when the train is above a predetermined speed, is interpreted as a hand brake position alarm when the train is at rest.

12 Claims, 3 Drawing Sheets

LOCOMOTIVE HAND BRAKE ALARM

This application claims benefit of the Sep. 24, 2001, filing date of U.S. provisional patent application Ser. No. 60/324,342.

BACKGROUND OF THE INVENTION

Rails cars and locomotives are known to be equipped with a service braking system wherein brakes on each individual car are applied by a central air-operated piston and cylinder system. A mechanically applied hand brake is also provided on most rail cars and locomotives for periods when the train is at rest and the air supply to the braking system is inactive, or for when a car or locomotive is parked apart from a train consist.

A typical prior art locomotive hand brake assembly is illustrated in FIG. 1. The hand brake system 10 includes a brake shoe 12 that may be selectively urged against a wheel 14 or axle of the locomotive by the operation of a hand wheel 16 or crank. Wheel 14 may be a drive wheel powered by drive motor 15. The hand wheel 16 is connected to a drive chain 18 though one or more gears 20 so that the chain 18 may be caused to rotate a bell crank 22 to apply the brake shoes 12 against the wheel 14. The drive chain 18 has a brake-pulling side 24 and a slack side 26. Such hand brake systems are available from Ellcon National, Inc. of Greenville, S.C. (www.ellcon.com)

A hand brake is designed to prevent a stationary rail vehicle from moving as a result of any slight grade in the track upon which it is parked or as a result of a momentary bump from an adjacent vehicle. Hand brakes are not designed for dynamic braking of the vehicle. Damage may result If a rail car or locomotive is operated with its hand brake engaged. If the brake system 10 is partially engaged when the vehicle is moved, the build-up of heat between the brake shoe 12 and wheel 14 may be sufficient to cause damage to one or both of these components or the associated axle, bearings, suspension, etc. If the brake system 10 is engaged sufficiently to prevent the wheel 14 from rotating when the locomotive is moved, there will be a build-up of heat between the sliding wheel 14 and the passing rail 28. Here again there may be damage to the wheel 14 and associated suspension parts, including the wearing of a flat area on the wheel 14. Should such an out-of-round wheel 14 subsequently be allowed to roll with the vehicle, there may be further damage caused to the rail 28 or even a derailment of the vehicle.

It is known in the art to provide a remote indication of the position of the hand brake system 10. U.S. Pat. No. 3,854,417 describes an indicator flag mounted on the side of a rail car. The indicator flag is connected to the hand brake wheel so that the position of the flag provides a visual indication of the position of the hand brake system that can be viewed from a position remote from the rail car. The utility of such a system is limited in conditions where visibility is poor, such as when an operator is located at a distant end of a long train, or during periods of low visibility such as in fog or darkness.

U.S. Pat. No. 4,296,707 describes a system that provides a leak path in the service brake air system to indicate when a hand brake is engaged. When the service brake air system is pressurized in preparation for train departure, a low pressure in the service brake system will alert the operator to the existence of an abnormal condition. The leak path may function as a whistle to provide an audible alarm of the engaged hand brake. This system adds a potential failure mechanism to the important service brake air system.

It is also known to provide an alarm or to take other mitigating action when a train is operated above a predetermined speed with a hand brake engaged. U.S. Pat. Nos. 5,394,137 and 5,701,974 describe air-operated parking brake systems. The apparatus of U.S. Pat. No. 5,394,137 senses the presence of operating pressure in an air brake system and provides an alarm if the speed of the train exceeds a predetermined value. The apparatus of U.S. Pat. No. 5,701,974 will function to automatically release an air brake system when the train exceeds a predetermined speed. Most locomotives are also equipped with a locked-axle detection and alarm system that works in conjunction with a wheel slip detection system. These systems will provide an alarm if one axle is turning at a significantly slower speed than the others when the train is operating at above a predetermined speed. Once a locked axle alarm has sounded, administrative procedures require that the train be stopped and inspected. All of these systems serve to mitigate the damage that may be caused by operating a train with a hand brake engaged, but they do not prevent such damaging operation.

It is known to provide a switch 30 to detect the position of the slack side 26 of a drive chain 18 in a mechanical hand brake system 10. The switch 30 completes an alarm circuit 32 including an indicator lamp 34 for warning an operator that the hand brake is engaged. The term "engaged" is used herein to include a range of positions between fully engaged and partially engaged when the brake is not fully released, as selected by the system designer. It is important to notify an operator when a hand brake is providing a degree of braking that may cause damage if the vehicle is propelled. Switch 30 may be calibrated to provide such a signal at whatever degree of engagement is deemed appropriate by the designer of the system. In many embodiments such a signal is provided whenever the hand brake is in a not fully disengaged position. Prior art systems move the switch 30 with a mechanical linkage 36 that is connected to the slack side 26 of chain 18. When the hand wheel 16 is rotated to engage the brake shoe 12 against wheel 14, the slack side 26 is lowered by gear 20 and the linkage 36 depresses the switch 30. The linkage 36 is lifted away from the switch 30 when the brake shoe 12 is disengaged and the slack side 26 is lifted by gear 20. Accordingly, the switch must support the weight of at least a portion of chain 18 when the hand brake system 10 is engaged. Typically, the switch will bear about 20 pounds of weight in this condition in some applications. If the rail vehicle is operated with the brake system 10 engaged, the switch 30 will be subjected to additional dynamic loads caused by the movement of the chain 18 resulting from the motion of the vehicle. Failures of switch 30 are known to have resulted from such dynamic load conditions.

SUMMARY OF THE INVENTION

Accordingly, an improved hand brake position indication system is needed for a rail vehicle.

A hand brake alarm apparatus is described herein as including: a detector for producing an alarm signal when a drive motor of a locomotive is energized coincident with a hand brake being engaged; and a hand brake position alarm responsive to the alarm signal. The alarm apparatus may further include: a multiunit communication wheel slip circuit comprising a wheel slip indicator in each of a plurality of locomotives; a multiunit communication general alarm circuit comprising a general alarm indicator in each of the plurality of locomotives; and further comprising a hand brake position alarm in each of the plurality of locomotives, each hand brake position alarm comprising the wheel slip indicator and the general alarm indicator of the respective locomotive. The alarm may include: a wheel slip indicator; a general alarm indicator; a hand brake position detection device for providing a hand brake engaged signal; a reverser position detection device for providing a reverser position signal; and a logic device having the hand brake engaged signal and the reverser position signal as inputs and having outputs connected to the wheel slip indicator and the general alarm indicator.

In a locomotive consist having a master locomotive and a slave locomotive interconnected by a multiunit communication line, a hand brake position alarm apparatus is described as including; a general alarm circuit of the multiunit communication line connected to a general alarm indicator in each of the master locomotive and the slave locomotive; a wheel slip alarm circuit of the multiunit communication line connected to a wheel slip indicator in each of the master locomotive and the slave locomotive; a master controller reverser position detector for producing a reverser position signal responsive to a position of a reverser in the master locomotive; a hand brake position detection device for producing a hand brake position signal responsive to a position of a hand brake; a logic device having the reverser position signal and the hand brake position signal as inputs and adapted to actuate the general alarm circuit and the wheel slip alarm circuit in response to simultaneous indications of the reverser being in a non-neutral position and the hand brake being in an engaged position.

In a further embodiment, a hand brake position indicating device for a multi-locomotive consist is described as including: a multiunit communication line general alarm circuit; a multiunit communication line wheel slip alarm circuit; a hand brake position detection device for producing a brake engaged signal; a master controller reverser position detector for producing a reverser out of neutral signal; and a means for energizing both the general alarm circuit and the wheel slip alarm circuit in response to coincident brake engaged and reverser out of neutral signals.

A method of alarming a hand brake of a rail vehicle is described as including: detecting an alarm condition when a preparation is made to energize the drive motor coincident with a hand brake being engaged; and providing an alarm indication in response to the alarm condition. The method may further include providing the alarm indication as a wheel slip indication coincident with a general alarm indication, and providing the alarm indication through a multiunit communication line interconnecting a plurality of locomotives for providing the alarm indication in each of the plurality of locomotives.

A further method of alarming an engaged hand brake in a multi-locomotive consist is described as including: providing a hand brake engaged signal in response to a hand brake being in an engaged position; providing a master controller reverser out of neutral signal in response to a reverser being in an out-of-neutral position; and simultaneously activating a multiunit communication line wheel slip alarm circuit and a multiunit communication line general alarm circuit in response to coincident hand brake engaged and reverser out of neutral signals.

A device for detecting the position of a rail vehicle hand brake is described as including: a circuit comprising a switch for providing a brake engaged signal and an indicator responsive to the brake engaged signal; a mechanism connecting the switch and a hand brake drive chain, the mechanism movable with the drive chain to operate the switch between an engaged position and a disengaged position; and the mechanism defining a load path for supporting a weight of the drive chain bypassing the switch. The device may further include: an anchor bracket connected to the rail vehicle; a pivot arm connected to the drive chain and pivotally connected to the anchor bracket for movement with the drive chain; the pivot arm further comprising a stop surface for contacting the anchor bracket when the pivot arm is in a stop position. The pivot arm may include an upper stop surface for contacting the anchor bracket when the pivot arm is in a first stop position and a lower stop surface for contacting the anchor bracket when the pivot arm is in a second stop position.

A further embodiment of a rail vehicle hand brake position indicating device is described as including: a circuit comprising a switch and an indicator responsive to a position of the switch; a hand brake drive chain movable from an engaged position to a disengaged position; and a means for connecting the switch and the drive chain without supporting a weight of the drive chain through the switch.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
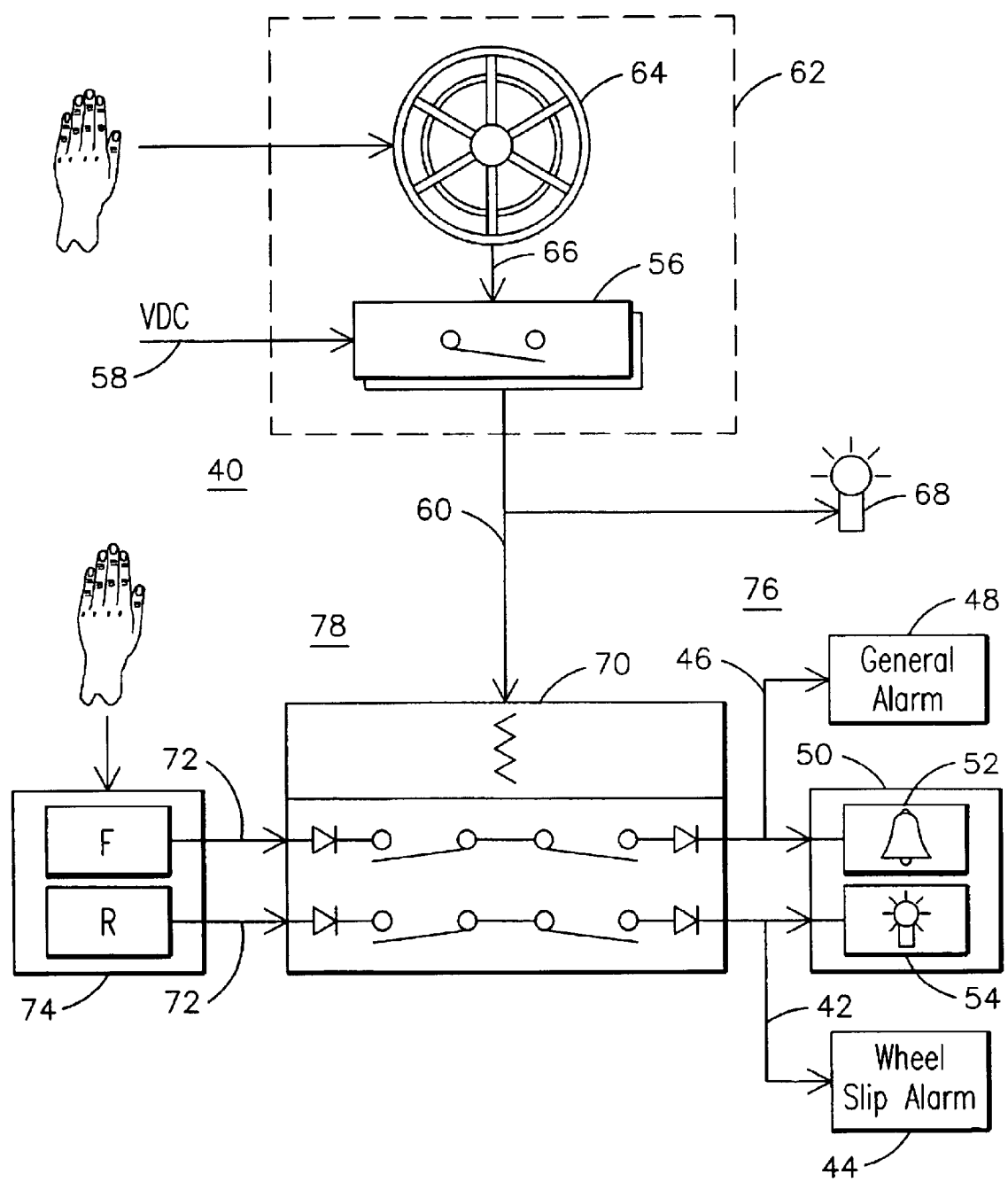
FIG. 2 is a schematic illustration of an improved hand brake system.

An improved hand brake system 40 is illustrated in schematic form in FIG. 2. The system 40 is illustrated for a multi-locomotive consist application, although it may be successfully applied to other types of rail vehicles and to single rail vehicles. A multi-locomotive consist is known to have a master locomotive occupied by an operator and at least one slave locomotive wherein there may be no operator. The locomotives are interconnected and simultaneously controlled from the master locomotive through a multiunit communication line (M/U line) having a protocol described in Association of American Railroads specifications. Included in the multiunit communication line is a wheel slip alarm circuit 42 including a wheel slip alarm indicator 44 in each locomotive of the consist. The wheel slip alarm indicator 44 may be a lamp on a display panel, an indication on a cathode ray tube, or other known type of indicator. The wheel slip alarm circuit is a known circuit that provides an alarm to the operator in the event that one wheel or axle of a locomotive is turning at a speed significantly different than other wheels or axles. The wheel slip alarm circuit is known to include logic for presenting such alarm to the operator only when the speed difference between wheels or wheel acceleration exceeds a predetermined lower limit, such as 10 miles per hour, in order to minimize the occurrence of such alarms during slow speed acceleration conditions. Also included in the multiunit communication line is a general alarm circuit 46 including a general alarm indicator 48 in each locomotive of the consist. The general alarm indicator 48 is typically a bell. The general alarm circuit 46 also typically includes push button actuators (not shown) that allow the operator to sound the bell manually from any of the locomotives in the consist.

A locked axle indicator 50 is provided in each locomotive of the consist. A known locked axle indicator 50 includes the simultaneous alarming of a general alarm bell 52 and a wheel slip indicator lamp 54. Logic for activating the locked axle indicator 50 is known in the art. The locked axle alarm generally builds upon the wheel slip indication alarm logic and it alarms situations of extreme speed differential between wheels or axles. As with the wheel slip alarm circuit 42, the locked axle alarm includes logic for presenting the alarm only when the locomotive is traveling at speeds in excess of a predetermined minimum, such as 10 miles per hour.

The brake system 40 also includes a hand brake position detection device such as switch 56. The switch 56 is provided with an input power source, such as a typical 74 volt direct current power line 58, and it is adapted to provide a brake engaged signal 60 when a hand brake apparatus 62 is in an engaged position. Hand brake apparatus 62 includes a hand wheel 64 having a mechanical linkage 66 for moving switch 56 from an engaged position to a disengaged position corresponding to the engagement condition of the hand brake. In one embodiment, switch 56 is closed when the hand brake 62 is in a not fully released condition, thereby providing a 74 VDC brake engaged signal 60. Brake engaged signal 60 may be provided to an indicator light 68 for local indication on the locomotive having a not fully released (engaged) hand brake.

Advantageously, system 40 also provides an indication of the engaged hand brake in each of the other locomotives in the train consist. This is accomplished by using the multiunit communication wheel slip alarm circuit 42 and general alarm circuit 46. A logic device such as relay 70 has the brake engaged signal 60 as an input signal. Relay 70 is also provided with an input signal indicative of when power is being supplied or is prepared to be supplied to the main drive motors of the locomotive, for example master controller reverser handle position signal 72. A standard operator-controlled reverser handle mechanism (not shown) has forward, reverse and neutral positions. When the reverser is in a non-neutral position, either forward or reverse, propulsion circuit switching is done in preparation to supply power is supplied to the drive motors of the locomotive consist, and reverser position detector 74 operates to provide the corresponding reverser position signal 72 to relay 70. When a coil side of relay 70 is energized by brake engaged signal 60, a non-neutral reverser position signal 72 will energize the locked axle indicator 50 in each locomotive via the multiunit communication line circuits 42, 46. The operator will recognize a hand brake position indication alarm 76 as the combination of the wheel slip alarm 44 and the general alarm 48 being announced with the train at rest or at a speed below the minimum speed for the locked axle alarm 50, and also from the fact that the alarm occurs immediately upon the reverser handle being positioned away from the neutral position. The hand brake position signal 72 may also include the local hand brake position indicator light 68 in the locomotive having the not fully engaged hand brake.

The hand brake system 40 provides an operator with a hand brake position alarm 76 in each vehicle connected to the multiunit communication line. This is accomplished when the vehicle having the engaged hand brake is equipped with a detector 78 for producing an alarm signal when a drive motor of a locomotive is energized coincident with a hand brake being engaged. In the embodiment of FIG. 2, detector 78 includes the limit switch 56, reverser position detector 74, relay 70 and associated power supplies and interconnections. The operator is provided with the hand brake position alarm 76 as soon as the reverser is moved into the forward or reverse position and before the train is actually moved. Unlike prior art alarms, the present hand brake position alarm 76 is provided before any damage occurs to the train components or to the rail.

Figure 1:
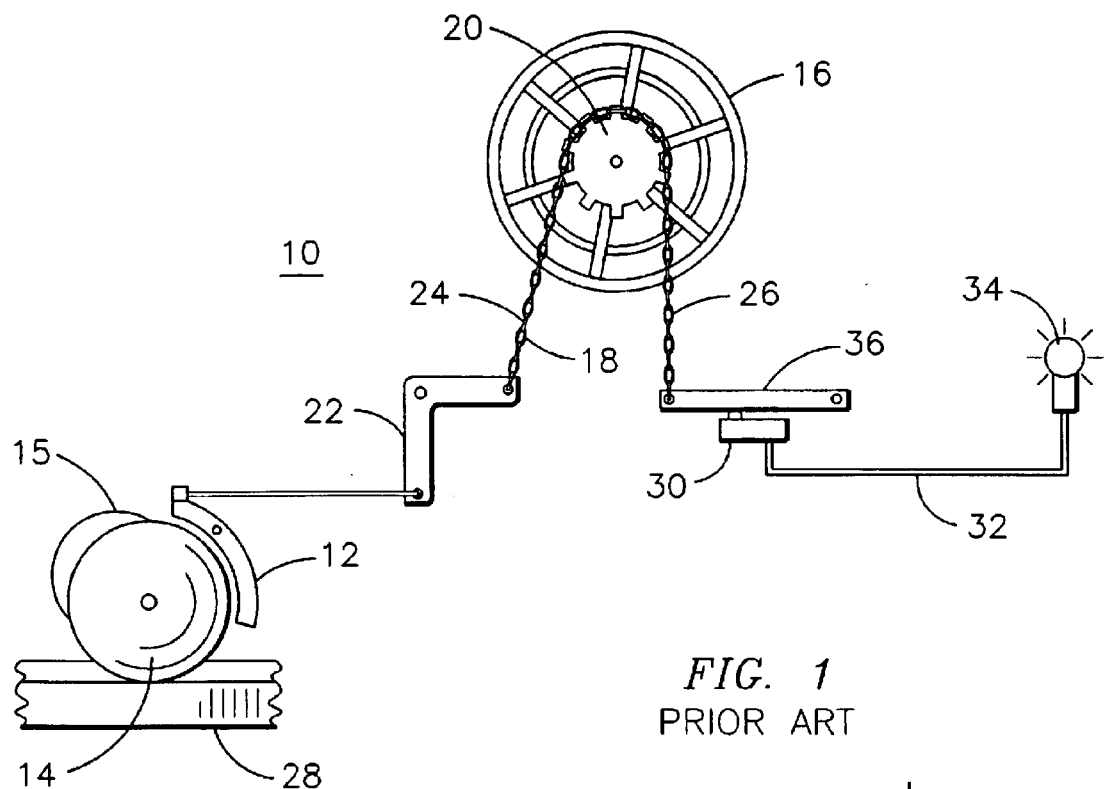
FIG. 1 is a schematic illustration of a prior art hand brake system.
Figure 3:
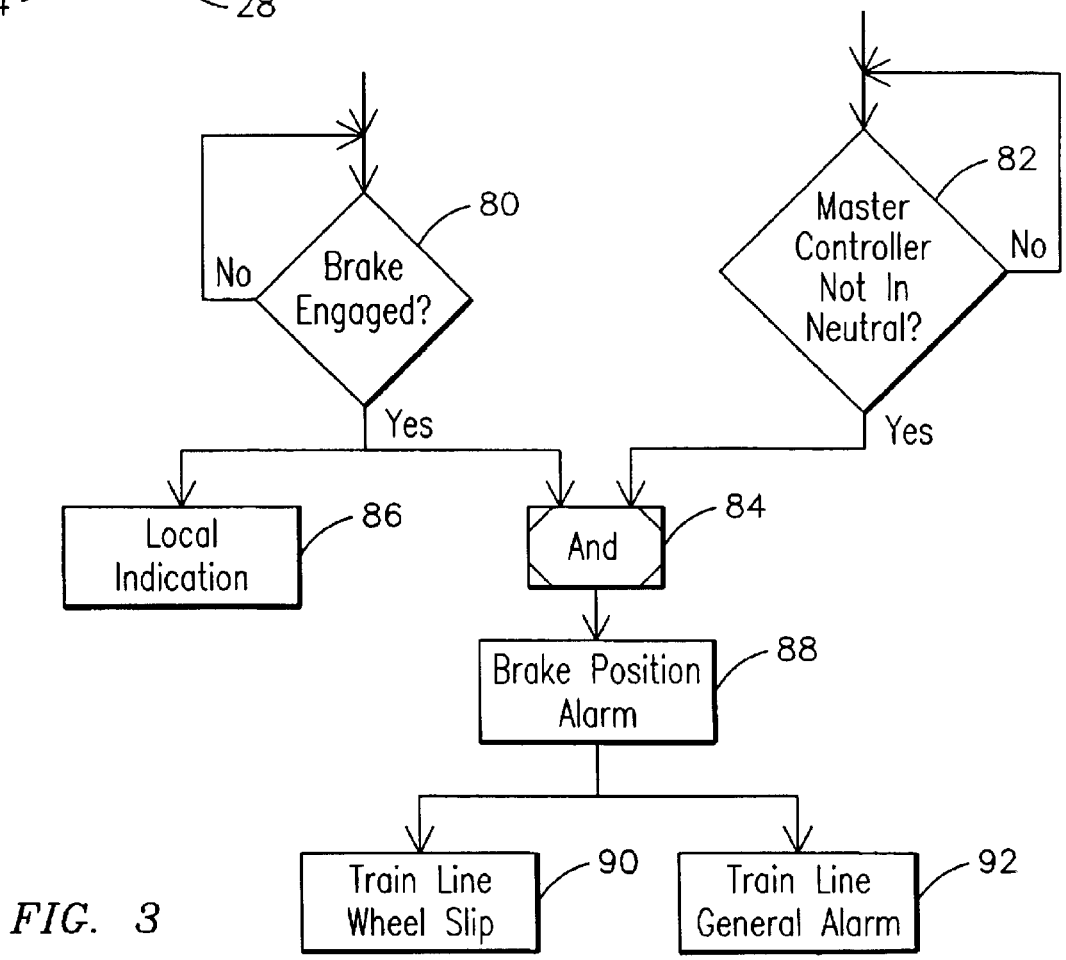
FIG. 3 is diagram of logic performed by the hand brake system of FIG. 2.

The logic implemented by hand brake system 40 is illustrated in FIG. 3. The output of brake engaged decision block 80 and the output of master controller reverser handle not in the neutral position decision block 82 are inputs to and-gate 84. The output of brake engaged decision block 80 is also provided as input to local brake engaged indication block 86. If both inputs are present, and-gate 84 energizes brake position alarm signal 88 for actuation of both the train line wheel slip 90 and general alarm 92.

One skilled in the art will appreciate that the advantages of the hand brake system 40 may be accomplished in other embodiments. For example, the function of relay 70 may be accomplished by other types of and-gate logic devices, notably coded software instructions executable on a computer or microprocessor. The function of reverser position detector 74 may be provided by other devices that are capable of sensing when power is being supplied or is prepared to be supplied to a drive motor, for example voltage or current meters in the motor drive circuit or programmed instructions in a motor drive software routine. Normally open contacts may be replaced by normally closed contacts, direct current may be replaced by alternating current, wireless communication may be used in place of a hard-wired M/U line, and redundant components may be used as desired. The entire system or the various parts of the system may be embodied in discrete components, integrated components or software systems. Similar logic functions may be accomplished for other designs of locomotive control systems. For example, the function of the master controller reverser handle may be performed via a touch screen device rather than with a traditional handle, however, a corresponding reverser position signal 72 can still be provided as input to a logic device 70.

Figure 4:
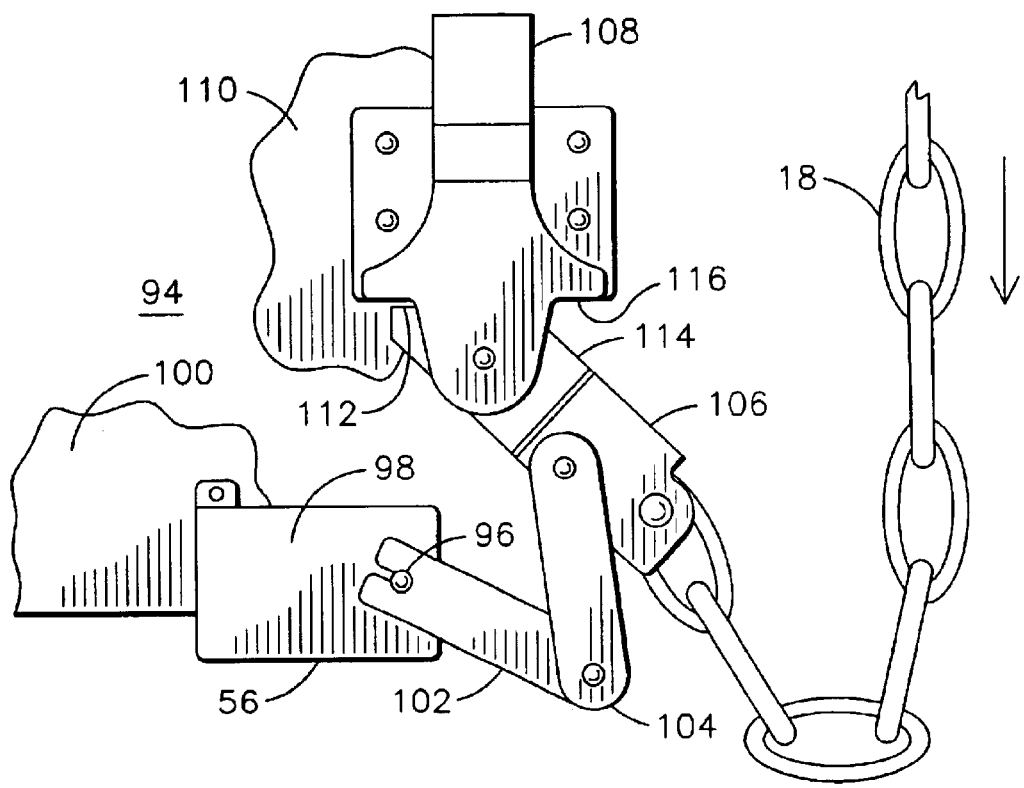
FIG. 4 is an elevation view of a hand brake position detection device in a brake-engaged position.
Figure 5:
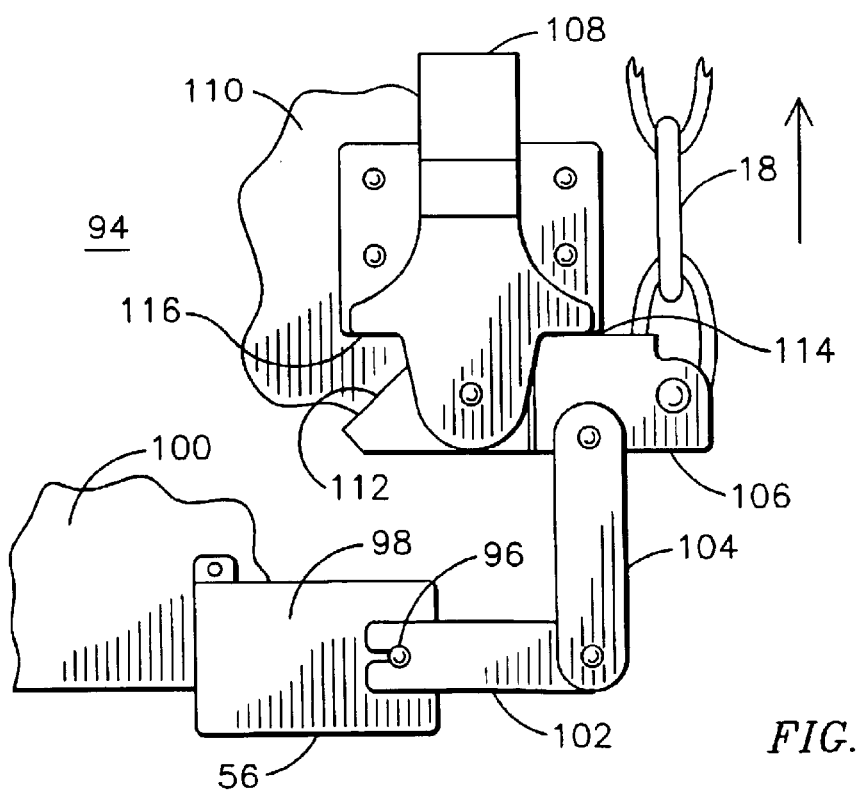
FIG. 5 is an elevation view of the hand brake position detection device of FIG. 4 in a brake-disengaged position.

FIGS. 4 and 5 illustrate a brake position detection device 94 in a brake-engaged position and in a brake-disengaged position, respectively. Switch 56 has a shaft 96 sealingly protruding from switch housing 98 for rotation from a brake-engaged position as shown in FIG. 4, to a brake-disengaged position as shown in FIG. 5. Switch 56 may be mounted to a front panel 100 of a hand brake housing. An actuator arm 102 is fixedly attached to shaft 96 and rotatably attached to link 104 for interconnecting the shaft 96 to a pivot arm 106. Pivot arm 106 is connected to slack side 26 of hand brake drive chain 18 proximate one end and is rotatably connected to an anchor bracket 109. Anchor bracket may be mounted to a back panel 110 of the hand brake housing, which in turn is mounted on the rail vehicle. Pivot arm 106 has a lower stop surface 112 and an upper stop surface 114 for contacting a bottom surface 116 of anchor bracket 108 when in a brake-engaged position and a brake-disengaged position respectively.

As slack side 26 of chain 18 is moved downward to engage the hand brake, the weight of chain 18 will cause pivot arm 106 to rotate about anchor bracket 108 until it reaches the brake-engaged position of FIG. 4. In this position, switch 56 has been moved to an engaged position.

Further downward movement of chain 18 does not cause additional rotation of pivot arm 106 or further movement of switch shaft 96. Importantly, the abutment of lower stop surface 112 against lower surface 116 supports the weight of chain 18. The load path for support of the weight of chain 18 passes through pivot arm 106 and anchor bracket 108 to rear panel 100, thereby bypassing switch 56. Accordingly, the dead weight and/or dynamic loads created by the chain 18 do not effect the reliability of switch 56.

As slack side 26 of chain 18 is moved upward to disengage the hand brake, the upward movement of chain 18 will cause pivot arm 106 to rotate about anchor bracket 108 until it reaches the brake-disengaged position of FIG. 5. In this position, switch 56 has been moved to a disengaged position. Further upward movement of chain 18 is prevented by the abutment of upper stop surface 114 against lower surface 116, thereby preventing the accidental disengagement of chain 18 from gear 20. Tension in the chain 18 caused by excessive rotation of hand wheel 16 is counteracted by a load path passing through pivot arm 106 and anchor bracket 108 to back panel 110, thereby bypassing switch 56.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A hand brake position alarm for a locomotive, the alarm comprising:

a wheel slip indicator;

a general alarm indicator;

a hand brake position detection device for providing a hand brake engaged signal indicative of a hand brake of the locomotive being engaged;

a reverser position detection device for providing a reverser position signal indicative of a reverser of the locomotive being in a non-neutral position; and a logic device having the hand brake engaged signal and the reverser position signal as inputs and having outputs connected to energize both the wheel slip indicator and the general alarm indicator upon the existence of coincident hand brake engaged and reverser position signals.

2. In a locomotive consist having a master locomotive and a slave locomotive interconnected by a multiunit communication line, a hand brake position alarm apparatus comprising:

a general alarm circuit of the multiunit communication line connected to a general alarm indicator in each of the master locomotive and the slave locomotive;

a wheel slip alarm circuit of the multiunit communication line connected to a wheel slip indicator in each of the master locomotive and the slave locomotive;

a master controller reverser position detector for producing a reverser position signal responsive to a position of a reverser in the waster locomotive;

a hand brake position detection device for producing a hand brake position signal responsive to a position of a hand brake;

a logic device having the reverser position signal and the band brake position signal as inputs and adapted to actuate the general alarm circuit and the wheel slip alarm circuit in response to simultaneous indications of the reverser being in a non-neutral position and the hand brake being in an engaged position.

3. A hand brake position indicating device for a multi-locomotive consist comprising:

a multiunit communication line general alarm circuit;

a multiunit communication line wheel slip alarm circuit;

a hand brake position detection device for producing a brake engaged signal;

a master controller reverser position detector for producing a reverser out of neutral signal; and a circuit energizing both the general alarm circuit and the wheel slip alarm circuit in response to coincident brake engaged and reverser out of neutral signals.

4. A method of alarming a hand brake of locomotive, the method comprising:

detecting an alarm condition when a preparation is made to energize a drive motor coincident with a hand brake being engaged by detecting movement of a master controller reverser of the locomotive to a non-neutral position coincident with the hand brake being engaged; and providing an alarm indication in response to the alarm condition before the rail vehicle is moved with the hand brake engaged.

5. The method of claim 4, further comprising providing the alarm indication as a wheel slip indication coincident with a general alarm indication.

6. The method of claim 4, further comprising providing the alarm indication through a multiunit communication line interconnecting a plurality of locomotives for providing the alarm indication in each of the plurality of locomotives.

7. A method of alarming an engaged band brake in a multi-locomotive consist, the method comprising:

providing a hand brake engaged signal in response to a band brake being in an engaged position;

providing a master controller let reverser out of neutral signal in response to a reverser being in an out-of-neutral position; and simultaneously activating a multiunit communication line wheel slip alarm circuit and a multiunit communication line general alarm circuit in response to coincident hand brake engaged and reverser out of neutral signals irregardless of a speed of the consist.

8. A device for detecting the position of a rail vehicle hand brake, the device comprising:

a circuit comprising a switch for providing a brake engaged signal and an indicator responsive to the brake engaged signal;

a mechanism connecting the switch and a hand brake drive chain, the mechanism movable with the drive chain to operate the switch between an engaged position and a disengaged position; and the mechanism defining a load path for supporting a weight of the drive chain bypassing the switch.

9. The device of claim 8, further comprising:

an anchor bracket connected to the rail vehicle;

a pivot arm connected to the drive chain and pivotally connected to the anchor bracket for movement with the drive chain;

the pivot arm further comprising a stop surface for contacting the anchor bracket when the pivot arm is in a stop position.

10. The device of claim 9, wherein the pivot arm comprises an upper stop surface for contacting the anchor bracket when the pivot arm is in a first stop position and a lower stop surface for contacting the anchor bracket when the pivot arm is in a second stop position.

11. The device of claim 8, wherein the circuit further comprises:
   a locked axle indicator;
   a master controller reverser position detector for producing a review position signal; and
   a logic device having the reverser position signal and the brake engaged signal as inputs and adapted to energize the locked axle indicator when the reverser is in a non-neutral position and the hand brake is in an engaged position.

12. A rail vehicle hand brake position indicating device comprising:
   a circuit comprising a switch and an indicator responsive to a position of the switch;
   a hand brake drive chain movable from an engaged position to a disengaged position; and
   a mechanism connecting the switch and the drive chain without supporting a weight of the drive chain through the switch.

* * * * *